United States Patent
Wells

US006208759B1

(10) Patent No.: US 6,208,759 B1
(45) Date of Patent: Mar. 27, 2001

(54) SWITCHING BETWEEN BIT-RATE REDUCED SIGNALS

(75) Inventor: Nicholas Dominic Wells, Brighton (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/029,383

(22) PCT Filed: Aug. 19, 1996

(86) PCT No.: PCT/GB96/02036

§ 371 Date: Jul. 22, 1998

§ 102(e) Date: Jul. 22, 1998

(87) PCT Pub. No.: WO97/08898

PCT Pub. Date: Mar. 6, 1997

(30) Foreign Application Priority Data

Aug. 31, 1995 (GB) .................................................. 9517782

(51) Int. Cl.[7] ....................................................... G06K 9/36
(52) U.S. Cl. ............................ 382/232; 382/235; 382/236
(58) Field of Search .................................... 382/232, 235, 382/236; 386/4, 33, 52

(56) References Cited

U.S. PATENT DOCUMENTS

| 4,706,260 | 11/1987 | Fedele et al. | 375/27 |
| 5,325,131 | 6/1994 | Penney | 348/706 |
| 5,627,845 | * 5/1997 | Asano et al. | 371/43 |
| 5,687,095 | * 11/1997 | Haskell et al. | 364/514 A |
| 5,732,183 | * 3/1998 | Sugiyama | 386/4 |

FOREIGN PATENT DOCUMENTS

| 0637893 | 2/1995 | (EP) | H04N/7/26 |
| 0661885 | 7/1995 | (EP) | H04N/7/26 |

OTHER PUBLICATIONS

Chowdhury et al., "A Switched Model–Based Coder for Video Signals", IEEE Transactions on Circuits and Systems for Video Technology, vol. 4, No. 3, pp. 216–227, Jun. 1994.*

Pearson, "Developments in Model–Based Video Coding", Proceedings of the IEEE, vol. 83, No. 6, pp. 892–906, Jun. 1994.*

* cited by examiner

Primary Examiner—Jose L. Couso
Assistant Examiner—Anh Hong Do
(74) Attorney, Agent, or Firm—Venable; Robert Kinberg; Catherine M. Voorhees

(57) ABSTRACT

A switch arrangement is provided for MPEG or other bit-rate signals. An output switch (66) is arranged to switch between bitstream A; an interim bitstream developed about the switch point; and bitstream B. The interim bitstream is provided by a re-coder (64) the input to which is switched at (58) between a decoder (52) for bitstream A and a decoder (56) for bitstream B.

45 Claims, 2 Drawing Sheets

SWITCHING BETWEEN BIT-RATE REDUCED SIGNALS

BACKGROUND OF THE INVENTION

This invention relates to the switching of bit-rate reduced signals and in the most important example to the switching of bit-rate reduced video.

To achieve reasonable levels of bit-rate reduction—or compression—in video, it is generally not sufficient merely to reduce the number of bits required to transmit each picture or frame. Additional compression is achieved by transmitting a reduced number of complete frames, accompanied by prediction information (utilizing motion compensation) which enables a downstream decoder to generate "missing" frames from the prediction information, using a transmitted frame as a reference. The compressed signal accordingly lacks the regular frame sequence of conventional video and typically has in its place an arrangement of relatively infrequent reference frames with interspersed prediction frames. Depending on the compression scheme employed, these prediction frames may be all of the same kind, utilizing forward prediction only, or may include both forward and backward prediction frames.

It will be understood that conventional techniques of switching between video signal sources at a convenient frame boundary, if employed with a compressed signal of this nature, would most times separate prediction frames from the reference frames to which they relate. This would lead to nonsensical results at the downstream decoder, lasting for a significant time period.

A prior suggestion for dealing with this difficulty relies on forcing the switching to take place at a reference frame. This is not a satisfactory solution, however, since constraining the switching points will not generally be acceptable unless it is separately ensured that the reference frames are close together. This may not always be possible and will, of course limit the degree of bit-rate reduction that can be achieved.

A further substantial obstacle to the switching of bit-rate reduced video arises from the use in a typical compression coder/decoder pair of coder and decoder data buffers. A typical coder, from the nature of the transform employed and from the use of variable length coding, will produce data at variable rates and will require a data buffer in order to feed a constant bit-rate transmission channel. Similarly, the downstream decoder will require a data buffer to enable it to use data from the constant bit-rate channel at the variable rates required to de-compress the video signal. The upstream coder is able to regulate the rate at which data is output, in such a manner as to prevent overflow or underflow of data in the coder buffer. Typically this is done by controlling quantization levels.

In the conventional coder/decoder pair, this control exercised over buffer occupancy in the coder buffer serves automatically to prevent overflow or underflow of data in the downstream decoder buffer. However, it can readily be seen that if the input of a downstream decoder is switched from one upstream coder to another, this control over buffer occupancy is lost and overflow or underflow of data would be expected in the downstream decoder.

The lack of a workable method of switching bit-rate reduced video has had a number of unfortunate consequences. One example lies in broadcast networks where at a number of local centers, a facility is required for switching between a compressed network feed and a regional opt-out signal. The option of compressing the locally produced signal and merely switching between compressed network and regional signals, has not been available because of the problems that have been described above. At such centers therefore, the signal distributed on the national network would need to be decoded to analog or to uncompressed digital form, passed into a conventional mixer for switching to and from the regional program and the output of the mixer then recoded in compressed form before conveying it to the local transmitter.

In such an arrangement the digital decoder and encoder are constantly in circuit; this leads to a number of problems. There is for example a reduction in distributed picture quality because of the cascaded coding and decoding processes. Moreover, reliability is reduced because the signal path constantly includes additional and complicated decoder and re-coder.

On its path up the distribution chain, the signal may have to pass through two or three such regional opt-out centers and the loss in picture quality and loss of reliability are two reasons why such a solution would be unattractive.

It should be understood that the same problems will arise in switching between two bit-rate reduced video data streams.

What has been said in relation to bit-rate reduced video applies to bitstreams such as those generated by ITU/R 721 standard codecs but more importantly to bitstreams generated according to the MPEG1 and MPEG2 standards. The invention will also apply to other bit-rate reduced signals having reference frames separated by frames defined with respect to a reference frame and to other variable length coding schemes.

A method for being able to switch between bitstreams at frame boundaries—not restricted to reference frames—would also provide the basis for editing functions carried out on the compressed bitstream. Hitherto it has not been considered practicable to edit compressed sequences to frame accuracy when the compression system uses motion-compensated interframe prediction because—as has been explained—the frames are not independent. To decode one particular frame, many previous frames have to be decoded in order to generate a "prediction" using motion compensation from previous frames. Current, nonlinear editing systems based around the storage on disc of video in compressed form use compression schemes in which each frame is coded independently of the previous frames (eg. JPEG).

SUMMARY OF THE INVENTION

It is an object of the present invention to provide an improved method of switching a bit-rate reduced signal which permits switching of the bitstream at frame boundaries and which minimizes the impairments introduced by cascaded decoding and recoding.

Accordingly, the present invention includes in one aspect in a method of switching a bit-rate reduced signal, comprising the steps of developing a re-coded signal through cascaded decoding and re-coding processes; switching between the bit-rate reduced signal and the re-coded signal at an appropriate signal point and subsequently switching to an alternative bit-rate reduced signal.

Preferably, the re-coded signal is developed by passing the bit-rate reduced signal through a decoder and re-coder pair and wherein the alternative bit-rate reduced signal is derived by switching the input of the re-coder to an alternative signal source.

In another aspect, the present invention includes an apparatus for switching a bit-rate reduced signal at an output terminal, comprising an input terminal for receiving a bit-rate reduced signal; an output switch; a direct path for passing the bit-rate reduced signal to the output switch without decoding; a decoder for receiving the bit-rate reduced signal; a coder for receiving decoded signal from the decoder and supplying re-coded signal to the output switch, the output switch being adapted to switch at the output terminal between the bit-rate reduced signal and the re-coded signal; and re-coder switch means for receiving an alternative signal and applying it to the coder in substitution for said decoded signal.

In a further aspect, the present invention includes an arrangement of first and second signals where each signal is capable of representation in coded and decoded forms, the coded form comprising a sequence of frames including both reference frames and frames defined with respect to reference frames, the method of switching between the first signal in coded form and the second signal in coded form, comprising the steps of receiving the first signal in coded form; decoding and recoding the first signal to provide a recoded first signal in frame synchronisation with the coded first signal as received; switching in the coded domain between the coded first signal as received and the re-coded first signal; and switching in the uncoded domain between the decoded first signal and the second signal.

In this ingenious fashion, it is ensured that—from the critical viewpoint of the downstream coder—the switch away from the current signal takes place not to an unconnected compressed signal source, but to a decoded and recoded version of the same signal. This enables the switch to be arranged in such a way as to keep disruption at the downstream decoder to a minimum. In quick succession, the decoded original signal at the "re-coder" is replaced by the new signal source. This might be an analog signal in a regional opt-out center, a digital signal or an alternative source of compressed signal, decoded immediately before it is presented to the re-coder.

Since the decoder/recoder pair are not required to remain permanently in circuit, and come into operation only at a switch point, reductions in picture quality are kept to a minimum.

Advantageously, the bit-rate reduced signal derives from an upstream coder utilizing a data buffer, the method comprising the step of forcing the buffer occupancy of the re-coder data buffer to follow the buffer occupancy of the upstream coder, the buffer occupancy of the upstream coder being suitably inferred from the complementary buffer occupancy of the decoder.

In still a further aspect, the present invention includes a system comprising at least one upstream coder utilizing a data buffer to derive a bit-rate reduced signal for decoding in a downstream decoder having a data buffer the variation in occupancy of which is determined by the variation of occupancy of the upstream coder buffer; and at least one re-coder in a path between the upstream coder and the downstream decoder, wherein the data occupancy of said re-coder is constrained to follow that of the upstream coder, enabling a switch to be made from said bit-rate reduced signal, without discontinuity in the downstream decoder buffer.

In this way, the problem of overflow or underflow at the downstream decoder buffer is overcome. From the viewpoint, again, of the downstream coder, a switch is made from an upstream coder having a buffer occupancy over which no control can be exercised at this level, to a re-coder which is artificially arranged to have substantially the same buffer occupancy.

BRIEF DESCRIPTION OF THE DRAWINGS

The present invention will now be described by way of example with reference to the accompanying drawings, in which.

DETAILED DESCRIPTION OF THE INVENTION

It will be helpful to preface the description of preferred embodiments of the present invention with a more detailed explanation of the above-mentioned problem. There will also set out a fresh analysis of the problem, to be regarded as forming part of one aspect of this invention.

The combination of DCT coding, quantization of DCT coefficients and variable-length coding of the quantized coefficients—common to ITU/R 721 and MPEG compression schemes—generates data at a variable rate within each frame. Also, the type of prediction selected for each frame causes the average data rate to vary on a frame-by-frame basis. At the coder, the data is written into a buffer store in order that the data rate can be smoothed for transmission or storage. The long-term-average data rate at the input to this buffer store is controlled by adapting the quantization of the DCT coefficients.

At the decoder, there is a complementary buffer which has at its input data being received at a constant bit-rate while at its output it delivers data at the variable rate required by the first stage of the decoding process.

Figure 1A:
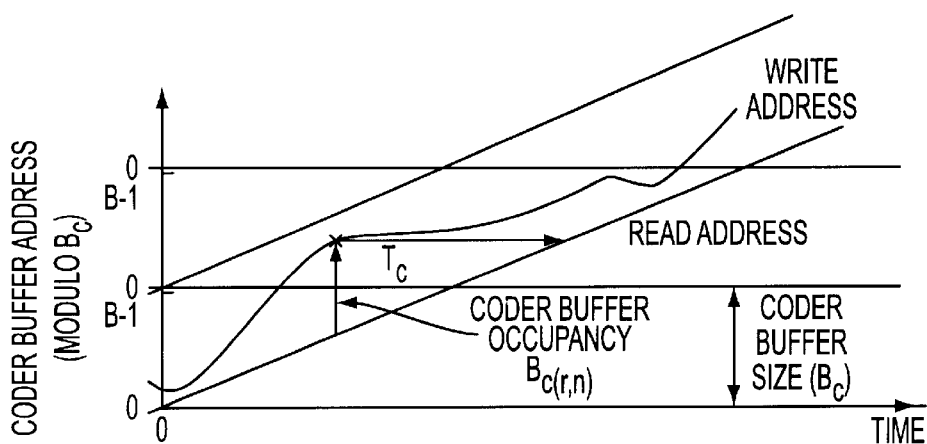
FIG. 1*a* and FIG. 1*b* illustrate the buffer states in a system with variable length coding respectively, showing at (a) the coder buffer and at (b) the decoder buffer.
Figure 1B:
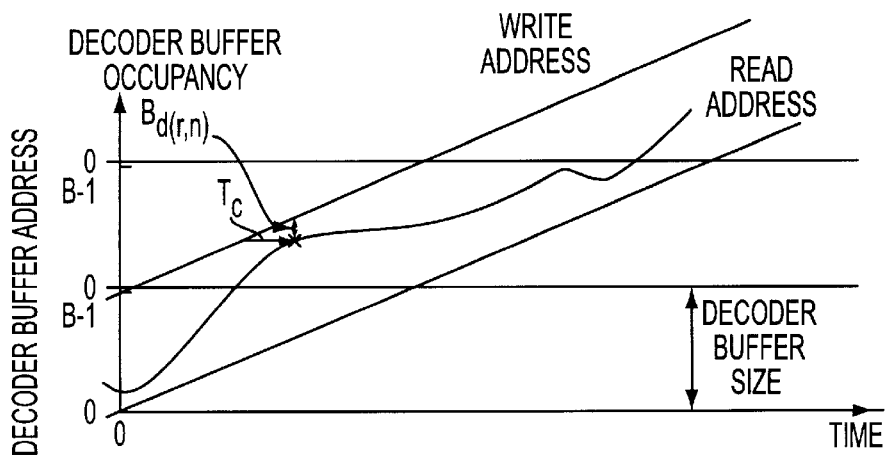

FIGS. 1*a* and 1*b* illustrates how the coder and decoder buffer read and write addresses might change with time. The coder read address and the decoder write address increment at a (typically) constant rate determined by the transmission channel. The coder write address increments at a rate depending on the amount of data being generated by the coder. At the decoder, the buffer read address increments at a rate determined by the subsequent decoding process.

At a given point in a given frame, the instantaneous data rate required by the decoder will equal the data rate generated by the coder for that part of the picture; (ie. the number of bits generated for a given block of picture equals the number of bits required to decode that same block) ie. when the transmission rate is fixed:

$$d/dt(B_c(r,n)) = -d/dt(B_d(r,n)) \quad (1)$$

or equivalently $$B_c(r,n) + B_d(r,n) = \text{constant} \quad (2)$$

where
r defines a two-dimensional point in picture or frame n
$B_c(r,n)$ is the coder buffer occupancy at the time when the data corresponding to the point r is being written into the coder buffer, and
$B_d(r,n)$ is the decoder buffer occupancy at some later time when the same data is being read from the decoder buffer This result is fundamental. The sum of the coder buffer occupancy and the decoder buffer occupancy is constant (for a given part of the picture, not at a given instant in time). Equivalently, if the coder buffer is empty at a particular picture point, then the decoder buffer will be full at that picture point, and vice versa. In standard compression systems, the decoder buffer is a known size. Therefore, the coder can prevent decoder buffer underflow or overflow by preventing overflow or underflow respectively in its own buffer.

Therefore, when switching between bitstreams, a requirement which must be fulfilled is that the coder buffer occupancies of the two bitstreams (at the point of switching) must be equal. It is not possible to switch from a bitstream from coder (A) with an empty coder buffer to a bitstream from coder (B) with a full buffer. At the switching point in the picture, the decoder buffer would have been full (bitstream A). However, coder (B), not knowing about a downstream switch is assuming that the decoder buffer is empty and that it can act in a way which will fill the decoder buffer. However, this will cause the decoder buffer to overflow at some time after the switch.

When switching between two bitstreams, three important criteria must be met to minimize the disturbance to a downstream decoder.
1. The bitstreams must be aligned such that the switching happens at the same place in relation to the synchronising information within both bitstreams; eg. immediately after a frame start code.
2. If preceding frames are used to generate predictions for frames after the switching point, then these preceding frames (when decoded) should be as similar as possible in both bitstreams.
3. The expected decoder buffer occupancies at the point of the switch must be the same for both bitstreams. (Note that the decoder buffer occupancy refers here to the time at which the switching point is read from the decoder buffer as in Equation (2)).

Referring back to FIG. 1, the time $T_c$ in for data in the coder buffer is given by $T_c=B_c(r,n)/R$ where R is the transmission rate. Similarly the time for data to be in the decoder buffer is given by $T_d=B_d(r,n)/R$ i.e.

$$T_c+T_d=(B_c(r,n)+B_d(r,n))/R=\text{constant} \quad (3)$$

Therefore, the delay through the coder/decoder pair is a constant even though the time spent by data in the coder buffer can vary considerably. The maximum time the data can spend in the coder buffer is $B_c(\text{max})/R$ and the minimum time is zero (for an empty coder buffer). The time spent in the decoder buffer is the complement of the time spent in the coder buffer.

Figure 2:
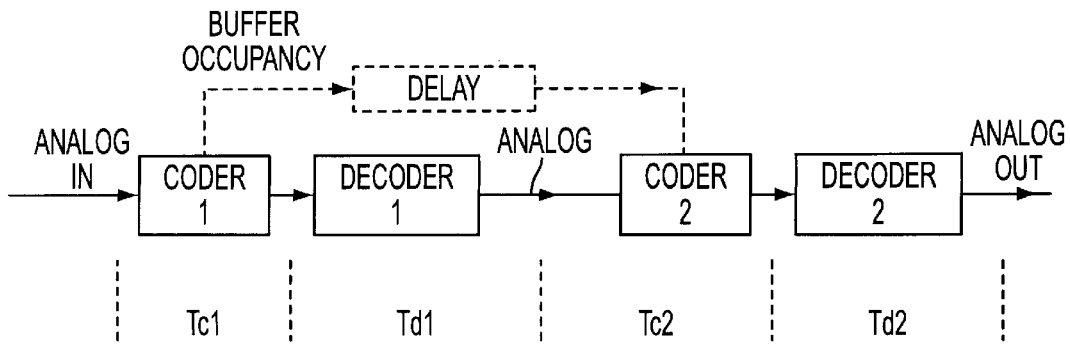
FIG. 2 illustrates an arrangement of two similar coder/decoder (codec) pairs in cascade.

Suppose we have two similar codec pairs in cascade as shown in FIG. 2. The total delay through each codec is set to be equal to T. Then, $$T_{c1}+T_{d1}=T \quad (4)$$

and $$T_{c2}+T_{d2}=T \quad (5)$$

However, there is no guarantee that $T_{c1}=T_{c2}$, because the decoded analog pictures will be different in some degree (eg. noise and distortion) from the source pictures.

It can be contrived that the second coder has a delay equal to the first coder by ensuring that the coder buffer occupancy for the second coder is equal to that for the first coder (assuming that all the digital transmission rates are the same). By passing information about the state of the first coder buffer to the second coder, it should be possible to adjust the rate control algorithm of the second coder such that the buffer occupancies are equal at specific points in the sequence such as at the start of each frame.

Then, at such points we say that:

$$T_{d1}+T_{c2}=\text{constant}=T \quad (6)$$

ie. that the process of decoding followed by recoding has a fixed and known delay.

Since, for a fixed bit-rate, the coder and decoder buffer occupancies are complementary, the state of the first coder buffer can also be deduced from the buffer occupancy of the first decoder.

Figure 3:
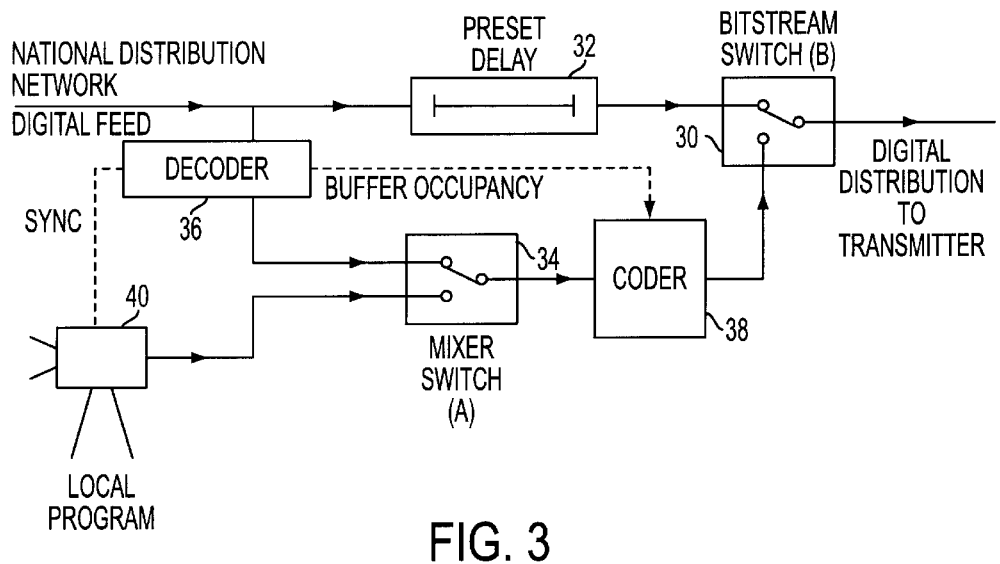
FIG. 3 shows an arrangement according to the present invention for a local opt-out switch.

Bearing the above in mind, it is now possible to understand an arrangement according to the present invention of an opt-out switch which overcomes the need to have a full decoding and re-coding process constantly in the distribution path. One arrangement is shown in FIG. 3.

A digital feed is taken from the national distribution network, through a preset delay 32 to a digital bitstream switch 30. The same feed passes to decoder 36, with the output of this decoder passing to a mixer switch 34. The other input to this switch 34 is provided by the local program source, which is depicted schematically at 40. A link is provided from the decoder 36 to the local source 40, enabling the local source to be brought into synchronism.

The output from switch 34 is taken to a coder 38 which is able to receive buffer occupancy information from the decoder 36. The output of the coder 38 provides a second input to the switch 30.

The manner of operation of the described circuit will now be explained.

At times when the opt-out was not required the digital switch 30 would be set to select the network signal via the preset delay 32. This would reduce reliance on the reliability of the complicated decoding and recoding equipment. Also, it would avoid the need for a cascaded decoding and recoding. The delay value would be preset to the coder/decoder delay, T, plus an allowance for the delay of the mixer/switch 34.

A short time before the opt-out, the local studio would be synchronised to the output of the decoder such that the decoded (analog) signals and locally sourced signals were in synchronism at the mixer switch 34.

Also, switch 34 would be set to select the decoded network signal available through decoder 36, such that the coder 38 was re-coding the network signal. As the coder 38 receives information from the decoder 36 about the state of the up-stream coder buffer, then the decoding and recoding delay could be made equal to the preset delay (at known points such as at the start of each frame). Then, the bitstreams at the input to the bitstream switch 30 will be aligned such that bitstream switch 30 can be switched to select the recoded path at a suitable point in the aligned bitstreams such as at a picture/frame start word.

In this instance, it is possible to switch bitstreams without causing the downstream decoder any significant disturbance because:
1. The bitstreams are aligned in relation to bitstream synchronisation information such as frame start codes.
2. The preceding frames used for coding (source and locally decoded) will be similar.
3. There is no discontinuity in expected downstream decoder buffer occupancy.

Once the output of coder 38 has been selected in switch 30, then the input to the coder 38 can be switched to the output of the local studio, represented in the figure at 40.

Since this is synchronous with the decoded signal, the coder 38 will simply treat this as a scene or shot change in the normal way without causing a significant degradation in coding quality.

It will be recognised that switch 34 (which is also designated in the figure as "Switch A") operates in the decoded, uncoded or picture domain, whilst switch 30 ("Switch B") operates in the coded domain.

Note that the cascaded decoding and recoding has only been in circuit for the period immediately preceding the opt-out. If switch 34 is switched almost immediately after switch 30, then the minimum amount of the decoded and recoded data transmitted corresponds only to that stored in the encoder buffer at the time of the switch.

The opt-out process may be summarised as follows:

| Stage | Switch 34(A) | Switch 30 (B) |
|---|---|---|
| 1 | Select decoded network feed Pass buffer occupancy information to recoder. | Select delayed network data. |
| 2 | Continue to select decoded pictures. | Select recoded data at suitable point in aligned bitstreams. |
| 3 | Select local studio output. | Continue to select coder bitstream. |

Switching back from the local studio to the network is generally the reverse of the above process. One difference in the reverse process is that after the mixer switch 34 switches from the local studio to the decoded network, the coder must be allowed to settle down before selecting the delayed network path at switch 30.

As well as passing buffer occupancy information from the decoder 36 to the coder 38, it is also possible to pass additional information such as motion vector fields and prediction mode decisions. It is expected that this would improve the quality of the cascaded coding process depending on how much information is passed from the decoder to the recoder.

In switching to and from the local opt-out, a method for precise alignment of the two bitstreams as switch 30 should be considered. One method is as follows.

It is ensured that the buffer occupancy of the (re)coder is slightly less than that of the upstream coder buffer at pre-defined switching points. (Note that this is the buffer occupancy when the information for that point is written into the coder buffer as in Equation (2) and not when it is read out). This ensures that the data relevant to the switching point should be available at the output of the (re)coder buffer just before it reaches the switch(B) via the present delay.

For switching from network to local opt-out, reading of the (re)coder buffer can be suspended until its output is selected by switch(B). Switch(B) is synchronised to data (such as frame start codes) in the present delay path.

When switching from local opt-out back to network, switch(A) first selects the decoded network signal. When the (re)coder is reliably recoding the network signal but with a slightly smaller coder buffer occupancy than the upstream coder (or equivalently with a smaller coder-buffer delay), data corresponding to the start of each frame will arrive at switch(B) a short time before that arriving via the preset delay. Stuffing bytes can then be added appropriately to the recoded data (at the output of the recoder buffer) until the delayed network path is selected at switch(B) in synchronism with the delayed data path. Alternatively, in variable data rate transmission systems, such as ATM networks, the transmission rate can be reduced instead of adding stuffing bytes to the transmitted data.

For MPEG signals, decoders are synchronised using a system of Presentation Time Stamps (PTS), Decoding Time Stamps (DTS) linked to a program Clock Reference (PCR) signal. These signals should be continuous across the bitstream switch in order not to confuse a downstream decoder. Therefore, in the (re)coder, they should be synchronised with the network signals, as appropriate.

This aspect of the present invention has provided—it will now be understood—a switching system for local opt-outs based on the principle that the distributed network signal should only suffer cascaded decoding and recoding for a short time around the moment of switching. This is achieved in summary by the following.

A combination of a decoder followed by a recoder is provided in a side chain with a bypass delay in the main path substantially equal to the delay introduced by the combination of coder and decoder buffers. A bitstream switch, switch(B), selects between the output of the delayed network bitstream in the main path and a decoded and recoded network signal, in the side chain. An analog (or equivalently digital) switch(A), which (at the input to the recoder) between the local signal and the decoded network signal. The local studio is synchronised with the decoded network signal such that switch(A) can select between the two inputs without causing a synchronisation disturbance to the recoder. Bitstream switch(B) selects between bitstreams at appropriate points (such as at frame synchronisation words). Selection at switch(B) is synchronised to the presence of this information in the delayed path of the network bitstream. Bitstream switch(B) only switches when the bitstream from the recoder is substantially similar to the delayed network bitstream. The buffer occupancy of the recoder is controlled to be slightly less than that of the upstream encoder whenever the recoder is encoding the decoded network signal. This requires that appropriate information is fed from the decoder to the recoder giving knowledge of the buffer occupancy of the upstream encoder.

The output of the recoder buffer can be paused or stuffing bytes added in order to bring the two bitstreams precisely into synchronism at the switching point. System information such as clock and decoding synchronisation data should be continuous across the switch and synchronised to the network signal.

The degradation in quality of the decoded and recoded signal can be minimised by passing additional information to the recoder (from the decoder) about coding decisions made by the upstream encoder. These decisions include motion vector information, prediction modes, DCT type, quantization step size and frequency weighting.

Figure 4:
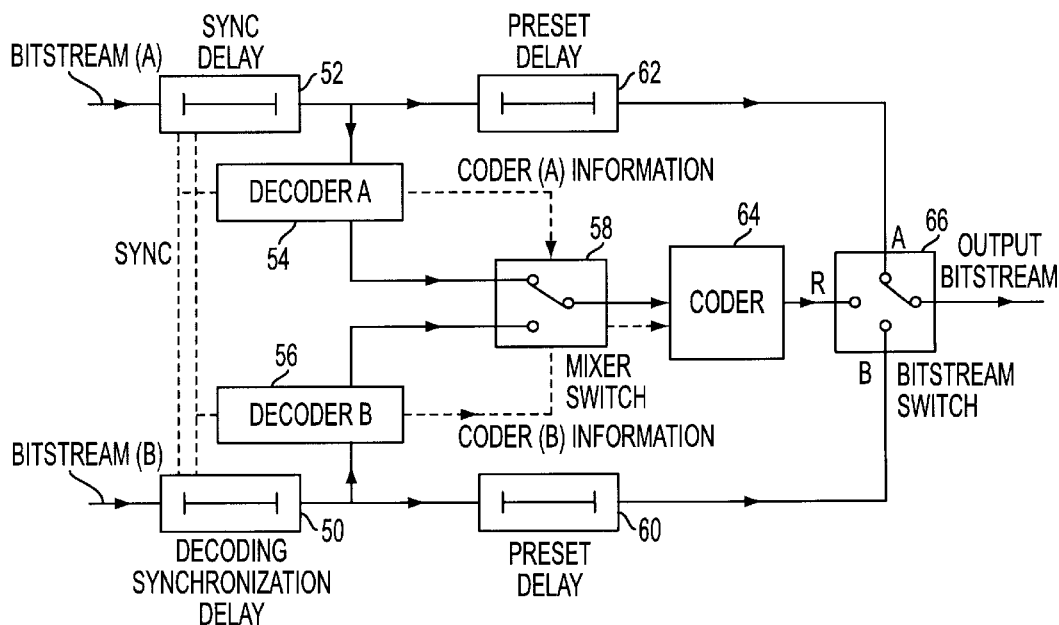
FIG. 4 shows an arrangement according to the present invention for switching between two bit-rate reduced signals.

The principles described above for local opt-outs can be extended to switching between two compressed bitstreams. A block diagram of a possible switching arrangement is shown in FIG. 4.

The purpose of the overall switch is to give an output which starts as a delayed copy of bitstream(A). At some time later after the switching process has been completed, the output is equal to a delayed version of bitstream(B). For a short period of time around the switching point, the output consists of signals A followed by B which have been decoded and recoded in such a way as to minimize the disturbance caused to a downstream decoder.

Comparing this arrangement with the local opt-out arrangement shown in FIG. 3, the local studio is replaced by a bitstream(B) decoder 56. In addition, there are decoder synchronisation delays (DSD) 50 and 52 which are provided to enable frame synchronisation of the decoded signals A and B at the input to the mixer switch 58. (There is no guarantee that the signals A and B were synchronous and co-timed at their respective upstream encoders. The DSD in the bitstream(A) path is set initially at a nominal value).

Also, there is a second preset delay 60 in the bitstream(B) path, analogous to the preset delay 62, in order to provide for the final delayed selection of this bitstream.

Assuming that there is, at this level, no control over the upstream encoders, switching from bitstream(A) to bitstream(B), proceeds in the following order:

| Stage | Mixer Switch 58 | Bitstream Switch 66 |
| --- | --- | --- |
| 1 | Select decoded (A) signal. Synchronise decoded (A) and decoder (B) signals. | Select delayed bitstream (A). |
| 2 | Keep decoded (A) selected. | Select recoded bitstream (R). |
| 3 | Select decoded (B) signal. | Select delayed bitstream (B) once recoded bitstream substantially equal to delayed bitstream (B). |
| 4 | Keep decoded(B) signal selected. | |

Switching back to bitstream (A) is the same process with A and B interchanged. Because upstream coders A and B have drifted apart in synchronisation, the decoder synchronisation delay 52 in front of decoder(A) 54 may need to be adjusted from its nominal setting.

Just as in the case of the local opt-out switch, when (re)coding the decoder(A) signal, the (re)coding buffer occupancy should be manipulated to be slightly less than the buffer occupancy of the upstream(A) encoder. This should ensure that the delay through the decoding and recoding process is slightly less than that through the preset delay path (A). This enables the bitstreams via the delayed path (A) and the recoding path to be brought exactly into synchronism at a suitable switching point in the bitstream by pausing the output of the (re)coder buffer. A suitable switching point would be at a frame start boundary.

Note that, with no control of the upstream encoder, the precise timing of the bitstream switch is set by the timing of the bits in the delayed path(A).

Once the (re)encoder is processing the B signal, the buffer occupancy should be manipulated to be slightly less than that of the upstream encoder(B). Then, a given (re)coded frame start should appear at the output of the recoder buffer just before the equivalent frame start code arrives at the bitstream switch via the preset delay 60. Stuffing bytes can then be added appropriately at the output of the (re)coder buffer such that the bitstreams are exactly synchronised as the designated switch point arrives via the delayed path(B). Note that, for this part of the switching process, the precise timing of the bitstream switch is set by the timing of the bitstream in the delayed path(B).

Switching from bitstream(B) back to bitstream(A) follows exactly the same process with A and B interchanged.

In the case of switching MPEG bitstreams, the rate control process is complicated by the need to take into account the different forms of prediction for different pictures within a "Group of Pictures" (GOP) structure. The GOP structure typically covers an interval of 0.5 seconds. It is likely that the rate control will take times of this order to manipulate the buffer occupancies around the switching points.

The GOP structures of the two bitstreams will probably not be aligned and the recoder will therefore need to make changes in its GOP structure during the switching process (eg. by changing an I frame to a P frame and one or two B frames). Also, the refresh strategies of the two bitstreams may be different (eg. I frames/I slices). The rate control of the recoder will have to merge intelligently from one strategy to the other.

Upstream encoder(A) and encoder(B) may not be in synchronism. However, when switching, any clock recovery information and synchronisation forwarded to a downstream decoder must be continuous in order to avoid disrupting this decoder. For example, in MPEG terms this means that when switching from bitstream A to B, the Program Clock Reference signal (PCR) must be continuous although its rate of change need not be the same on either side of the switching point. Also, the Presentation Time Stamps (PTS) and Decoding Time Stamps (DTS) should vary in a continuous fashion across the switch.

Note that these constraints imply that, after the switch, the switched bitstream is not exactly equal to a delayed version of the input bitstream(B). Some "systems level" information, such as timing reference and synchronisation information remains changed by the switching process.

Also, on switching back to bitstream(A), the equivalent bitstream(A) parameters will be altered by passing through the switching process.

When one of the bitstreams is stored on disc, the decoding synchronisation delay is not required. In this case, the decoded(B) input to the digital mixer can be "cued up" and ready for selecting at the input to the Mixer Switch.

If all bitstreams are stored on disc, the switch can form the basis of a "nonlinear" editor. The two inputs to the switch could come from different parts of the same original sequence or from different sequences giving editing to the nearest frame. The recoded "edited" bitstream can be restored as required.

The quality losses during the time of cascaded decoding and recoding can be minimized, by passing much information as possible about the upstream coding process to the recoder. For the example of MPEG signals, helpful information would include:

1. Motion vectors.
2. Picture coding type (intra, non-intra, Predicted, Bi-directional).
3. Macroblock prediction coding mode (I, P, B skipped) for each macroblock.
4. DCT type (Frame/field).
5. Quantizer weighting matrices.
6. Quantizer step size.

Note that use of this information in the (re)coder could reduce the requirements for sophisticated motion estimation and mode decision circuitry at the recoder. This would reduce the costs of this type of switch.

Since the switching process involves decoding the input signals, it would be possible to perform simple mixing functions such as fades and wipes between the decoded signals at the Mixer Switch as well as the "simple" switching function.

Since the switching between signals effectively operates on decoded signals, it is not absolutely necessary that the two bitstreams have the same bit-rate. This is particularly important when handling MPEG coded signals which can have a range of bit-rates or even a variable bit-rate within a sequence.

Provided that the preset delays are set to correspond to the appropriate bit-rate and that buffer occupancies and system timings are continuous across the switch, the switching process should appear as little more than a variable bit-rate mode within the coding standard.

Note that a standard electrical interface for MPEG signals has not been defined at the filing date of this application. It is here assumed that MPEG signals will typically be carried by partial population of a much high data rate container (eg. ATM protocols in an SDH/STM1 container at 155 Mbit/s). Bit-rate is then determined simply by the density of partial population of the containers.

The Systems Level provides a means for transporting and synchronising the separating signals which make up a single program for multiplexing together several separate programs.

The switching process described in the earlier sections shows how an individual element (eg. video) of a program can be switched without causing significant disturbance or loss of quality to downstream decoder. However, there are many detailed System Level issues which are also involved with switching.

In the context of MPEG2 signals, several Systems Level items may need to be changed across the switch, such as:
1. Program Clock Reference (PCR) fields.
2. PTS and DTS values.
3. PES packet lengths.
4. Stream ID's.
5. Arrangement of PES packets within Transport Packets.
6. Program Association Table.
7. Program Map Tables.
8. Transport packet continuity counts.

Consequently, the switch may be surrounded by Systems Level demultiplexers at the bitstream inputs and by a remultiplexer at the output of the switch. The remultiplexer will make intelligent use of systems information decoded by demultiplexers. These Systems functions will remain "in circuit" at all times.

In summary, a mechanism for switching between compressed bitstreams has been proposed on the principle that the output bitstream should only suffer cascaded decoding and recoding for a short period around the moment of switching. This can be achieved by the following.

A combination of two decoders followed by a recoder is provided in a side chain with bypass delays in the main paths A and B which are substantially equal to the delays introduced by the combination of coding and decoding for each signal path A and B. A bitstream switch selects between the outputs of these delays and the output of the recoder. A Mixer Switch, at the input to the recoder, selects between decoded versions of A and B signals. Decoder synchronisation delays enable the decoded signals to be synchronised at the input to the mixer switch. The bitstream switch selects between bitstreams at appropriate points such as at frame synchronisation words and is synchronised to the presence of this information in the bitstream via the preset delay path. The bitstream switch only switches when the bitstream from the recoder is substantially equal to the bitstream via the appropriate delayed path. The buffer occupancy of the recoder is manipulated via the recoder rate control to be slightly less than that of the upstream coder whose signals it is recoding. The output of the recoder buffer can be paused or stuffing bytes added in order to bring the delayed bitstream and the recoded bitstream precisely into synchronism at the switching point. System information such as clock recovery and synchronization data should be continuous across the switch. The degradation in quality of the decoded and recoded signal can be minimized by passing additional information to the recoder (from the decoder) about coding decisions made by the upstream encoder. This information includes motion vectors, prediction modes, DCT type, quantization step size and frequency weighting.

In this manner, it is possible to minimize the time for which the signal is subjected to cascaded decoding and recoding processes. However, some Systems Level demultiplexing and remultiplexing may be required to be in circuit continuously.

It has been explained that this switch can form the basis of a frame nonlinear editor for compression schemes which use motion-compensated interframe prediction.

With non-real-time switching, for example between bitstreams stored on disc, the invention can be embodied in a modified form. The operation of the switching arrangement of FIG. 4 has been summarized above as resulting in the following time sequence at the switch output:

i) before switching, output is delayed version of bitstream A;

ii) for a short period of time around switching point the output consists of signals A followed by B which have been decoded and recoded in such a way as to minimize the disturbance caused to a downstream decoder;

iii) after switching, output is delayed version of bitstream B.

In this modified approach, the generation of the interim bitstream portion ii) may be undertaken not necessarily by dedicated hardware but by appropriately programmed processors. The generation of such software will be a straightforward matter for the skilled man following the teaching of this disclosure, and no further elaboration is required. It is expected that without dedicated hardware the generation of bitstream ii) will, with present day equipment, be too slow for real time application. This approach is therefore suggested for applications such as off-line editing. In the future, it may be that this approach proves to be of wider application.

The present invention has been described by way of example only and a wide variety of modifications are possible without departing from the scope of the appended claims.

What is claimed is:

1. A method of switching a bit-rate reduced signal, comprising the steps of:
   developing a re-coded signal in synchronism with the bit-rate reduced signal by passing the bit-rate reduced signal through a decoder and re-coder pair;
   switching between the bit-rate reduced signal and the synchronized re-coded signal at an appropriate signal point selected to produce minimal disturbance in a downstream decoder;
   and subsequently switching the input of the re-coder to an alternative signal source.

2. A method according to claim 1, wherein the bit-rate reduced signal derives from an upstream coder utilizing a data buffer, the method comprising the step of forcing the buffer occupancy of the re-coder data buffer to follow the buffer occupancy of the upstream coder.

3. A method according to claim 2, wherein the buffer occupancy of the upstream coder is inferred from the buffer occupancy of the decoder.

4. A method according to claim 2, wherein the buffer occupancy of the upstream coder is inferred from the delay of the decoder.

5. A method according claim 1, wherein the bit-rate reduced signals are coded video signals.

6. A method according to claim 1, further comprising the subsequent steps of switching back at the input of the re-coder from the un-coded signal source to the output of the decoder, and subsequently switching from the re-coded signal to the bit-rate reduced signal.

7. A method according to claim 1, wherein the alternative signal source comprises a second decoder operating on a second bit-rate reduced signal to produce a second decoded signal such that the re-coded signal is in synchronism with the second bit-rate reduced signal.

8. A method to claim 2, wherein buffer occupancy information is passed from said decoder to said re-coder.

9. A method according to claim 2, wherein motion vector information is passed from said decoder to said re-coder.

10. A method according to claim 2, wherein prediction mode decisions are passed from said decoder to said re-coder.

11. A method according to claim 2, wherein picture coding type information is passed form said decoder to said re-coder.

12. A method according to claim 2, wherein macroblock prediction coding mode information is passed from said decoder to said re-coder.

13. A method according to claim 2, wherein DCT type information is passed form said decoder to said re-coder.

14. A method according to claim 2, wherein quantizer weighting matrix information is passed from said decoder to said re-coder.

15. A method according to claim 2, wherein quantiser step size information is passed from said decoder to said re-coder.

16. A method according to claim 3, further comprising the subsequent step of switching from the re-coded signal to the second bit-rate reduced signal.

17. An apparatus for switching a bit-rate reduced signal at an output terminal, comprising:
an input terminal for receiving a bit-rate reduced signal;
an output switch, a direct appropriately delayed path for passing the bit-rate reduced signal to the output switch without decoding;
a decoder for receiving the bit-rate reduced signal;
a coder for receiving the decoded, bit rate reduced signal from the decoder and for supplying a re-coded signal to the output switch, wherein the coder receives buffer occupancy information from the decoder and; the output switch is adapted to switch at the output terminal between the bit-rate reduced signal and the re-coded signal; and
re-coder switch means for receiving an alternative signal and applying it to the coder in substitution for said decoded signal.

18. Apparatus according to claim 17, wherein the input terminal is adapted for connection with an upstream coder utilizing a data buffer, the coder of the apparatus having a data buffer the occupancy of which is constrained to follow the buffer occupancy of the upstream coder.

19. Apparatus according to claim 18, wherein the buffer occupancy of the upstream coder is inferred from the buffer occupancy of the decoder.

20. Apparatus according to claim 18, wherein the buffer occupancy of the upstream coder is inferred from the delay of the decoder.

21. Apparatus according to claim 17, comprising a second input terminal for receiving a second bit-rate reduced signal, a second appropriately delayed path for passing the second bit-rate reduced signal to the output switch without decoding; and a second decoder for receiving the second bit-rate reduced signal and providing said alternative signal to said re-coder means, wherein said output switch is adapted to switch at the output terminal between said bit-rate reduced signal, the re-coded signal and said second bit-rate reduced signal.

22. Apparatus according to claim 17, wherein the coder receives motion vector information from the decoder.

23. Apparatus according to claim 17, wherein the coder receives picture coding type information from the decoder.

24. Apparatus according to claim 17, wherein the coder receives macroblock prediction coding mode information from the decoder.

25. Apparatus according to claim 17, wherein the coder receives DCT type information from the decoder.

26. Apparatus according to claim 17, wherein the coder receives quantizer weighting matrix information from the decoder.

27. Apparatus according to claim 17, wherein the coder receives quantizer step size information from the decoder.

28. In an arrangement of first and second signals where each signal is capable of representation in coded and decoded forms, the coded form comprising a sequence of frames including both reference frames and frames defined with respect to reference frames, the method of switching between the first signal in coded form and the second signal in coded form, comprising the steps of:
receiving the first signal in coded form;
decoding and recoding the first signal to provide a recoded first signal in frame synchronization with the coded first signal as received;
switching in the coded domain between the coded first signal as received and the frame synchronized recoded first signal; and
switching in the uncoded domain between the decoded first signal and the second signal.

29. The method of switching according to claim 28, wherein the step of decoding and recoding the first signal to provide a recoded first signal in frame synchronisation with the coded first signal as received, includes the use in said recoding of coding information inferred in said decoding.

30. A method according to claim 29, wherein said coding information includes motion vector information.

31. A method according to claim 29, wherein said coding information includes picture coding type information.

32. A method according to claim 29, wherein said coding information includes macroblock prediction coding mode information.

33. A method according to claim 29, wherein said coding information includes DCT type information.

34. A method according to claim 29, wherein said coding information includes quantizer weighting matrix information.

35. A method according to claim 29, wherein said coding information includes quantizer step size information.

36. A system comprising:
a downstream decoder having a data buffer;
at least one upstream coder utilizing a data buffer to derive a bit-rate reduced signal for decoding in the downstream decoder where the variation of occupancy of the downstream decoder data buffer is determined by the variation of occupancy of the upstream coder; and
at least one re-coder in a path between the upstream coder and the downstream decoder, wherein the data occupancy of said re-coder is constrained to follow that of the upstream coder thereby enabling a switch to be made from said bit-rate reduced signal, without discontinuity in the downstream decoder data buffer.

37. A system according to claim 36, wherein the step of constraining the buffer occupancy of the re-coder to follow that of the upstream coder includes deriving buffer occupancy information in a decoder upstream of said re-coder.

38. A method according to claim 37, wherein buffer occupancy information is passed from said decoder to said re-coder.

39. A method according to claim 37, wherein motion vector information is passed from said decoder to said re-coder.

40. A method according to claim 37, wherein prediction mode decisions are passed from said decoder to said re-coder.

41. A method according to claim 37, wherein picture coding type information is passed from said decoder to said re-coder.

42. A method according to claim 37, wherein macroblock prediction coding mode information is passed from said decoder to said re-coder.

43. A method according to claim 37, wherein DCT type information is passed from said decoder to said re-coder.

44. A method according to claim 37, wherein quantizer weighting matrix information is passed from said decoder to said re-coder.

45. A method according to claim 37, wherein quantizer step size information is passed from said decoder to said re-coder.

* * * * *